Dec. 29, 1936.  E. GOLTSTEIN  2,065,968
RUBBER TIRE FOR SELF PROPELLED ROAD VEHICLES
Filed July 6, 1934
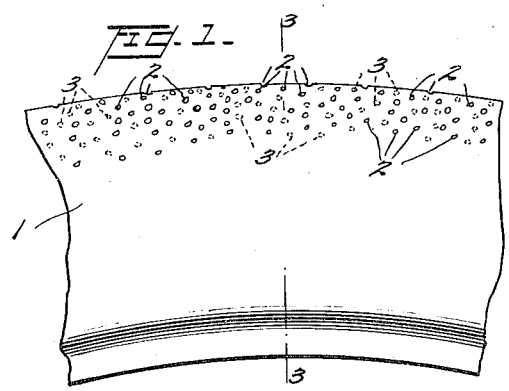
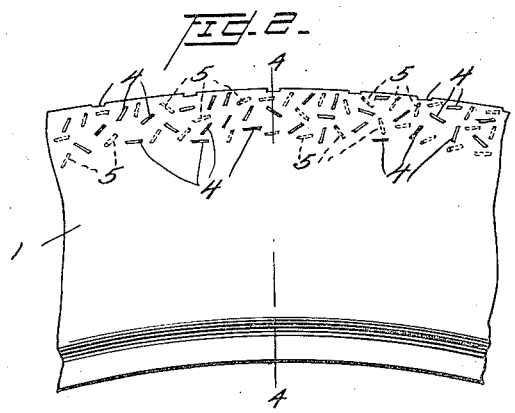
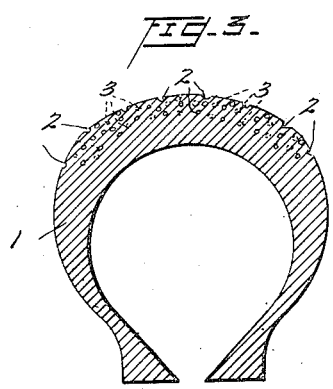
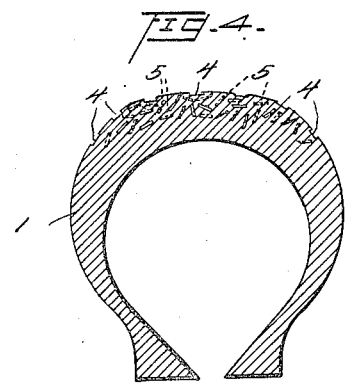
Inventor
Ewald Goltstein
By Smith, Michael & Gardiner,
Attorneys.

Patented Dec. 29, 1936

2,065,968

UNITED STATES PATENT OFFICE 2,065,968

RUBBER TIRE FOR SELF-PROPELLED ROAD VEHICLES

Ewald Goltstein, The Hague, Netherlands

Application July 6, 1934, Serial No. 734,029
In Germany July 20, 1933

4 Claims. (Cl. 152—14)

This invention relates to rubber tires for self-propelled road vehicles, more particularly motor cars.

It is known, for the purpose of rendering a rubber tire non-skidding, especially on a wet road, to incorporate into the tread of the tire particles of cork which are adapted as the tire rolls along the road and wears down at the tread surface, to evacuate said surface and leave the latter pitted or cavitied with a large number of small closely spaced recesses. These recesses are thought to provide reception spaces for the ready and rapid escape of the water of the wet road which would otherwise tend to form a lubricating film between the surface of the tire tread and the road, and it is believed that this is the theory of the remarkable anti-skidding effect obtained in these known tires.

The present invention relates to tires of this specific type, that is to say the type incorporating in the tread small grains of material (hereinafter referred to as vacating material) adapted to fall out bodily or intact at the tread surface as said surface rolls along the road and progressively wears down, leaving the surface in a cavitied or pitted condition as above described.

It has been found that while tires of this type are more or less satisfactory from the point of view of anti-skidding capacity, their mileage tends to be low. I have investigated this drawback and have found that it appears to be due to the fact that in the milling in of the cork particles with the rubber of the tread, the cork tends to fray and become disintegrated on the mill. Also, in the various processes involved in the manufacture of the tire, the particles of cork become still further broken up or weakened. In the result, it is frequently the case that only a relatively small proportion of the total mass of cork present in the tread is effective in the imparting of anti-skidding properties to the tire, the balance operating simply in the undesirable direction to reduce the coherence of the rubber of the tread and correspondingly its resistance to disintegration by the tractive and pressure stresses imposed in it in the use of the tire. In addition, the cork of commerce varies in quality to such a degree that its use for the purpose referred to tends to be inconvenient.

It is an object of the present invention to avoid these difficulties, and I accomplish this by employing, instead of particles of cork as hitherto, grains of sago or a substance of like nature, that is to say in respect of hardness or resistance to fracture by crushing and relative incompressibility. Thus, I have found that sago grains effectively resist disintegration both in the operation of milling them in as the vacating material with the rubber and also in the subsequent operations of manufacture of the tire to completion, with the result that the grains remain intact and, being substantially incompressible in contrast to the cork particles hitherto used, are in an easily detachable condition in the rubber so as to be readily detached therefrom leaving the pits or cavities referred to in the surface of the tread, as the tire rolls along the road and progressively wears down.

I have further found that it is important in order to secure the full advantageous effects of the invention to employ grains which, besides being of the hardness and relative incompressibility referred to, are of regular form, for example approximately round or cylindrical, in contrast to the irregular form characteristic of particles of disintegrated cork. Thus, by employing grains of regular form in this sense, it is still further ensured that the grains shall not disintegrate in the mechanical working of the rubber mix in which they are incorporated or in the subsequent operations performed in the manufacture of the tire, for the surface of the grains is devoid of external irregularities or projections tending to interengage with the surrounding rubber. Also, the freedom of the surface of the grains from external irregularities or projections enables the grains to avoid becoming interkeyed with the rubber of the tire tread in the finished state of the latter, with the result that the grains remain more or less loosely held in the rubber and are therefore the more free to vacate their cavities at the tread surface in conformity with their intended function.

In the accompanying drawing wherein I have illustrated several preferred embodiments of my invention, and wherein the size of the grains or granules of vacating material is shown on a slightly exaggerated scale for the purpose of illustration, Figure 1 is a fragmentary side elevation of a tire casing which has been subjected to use and wherein there is incorporated in the tread portion thereof substantially round grains of sago, vermicelli, macaroni, or the like, Fig. 2 is a view similar to Fig. 1, but showing substantially cylindrical grains of sago, vermicelli, macaroni or like material incorporated in the tread portion of the tire casing, Fig. 3 is a transverse sectional view on the line 3—3 of Fig. 1, and Fig. 4 is a transverse sectional view on the line 4—4 of Fig. 2.

Referring to the drawing wherein like reference numerals have been employed to designate like parts throughout the several views, the numeral 1 designates a tire casing of any preferred or desired construction, usually made of rubber or like resilient material. In the form of my invention shown in Figs. 1 and 3, the tire casing 1 has embedded therein, preferably at the tread portion only, numerous substantially round grains of sago, vermicelli, macaroni or like material. Certain of the round grains or granules have evacuated from the tread surface during the use of the tire and thus provide pits or cavities 2 which impart to the tread surface of the tire the desired anti-slipping property, those grains or granules remaining below the surface of the tread being designated by the numeral 3. In the form of my invention shown in Figs. 2 and 4, the tire casing 1 has embedded therein, preferably in the tread portion only, numerous substantially cylindrical grains or granules of sago, vermicelli, macaroni, or like material. Certain of the substantially cylindrical grains or granules have evacuated from the tire surface during the use of the tire and thus provide pits or cavities 4 which impart to the tread surface of the tire the desired anti-slipping property, those grains or granules remaining below the surface of the tread being designated by the numeral 5.

It will be obvious that in the forms of my invention disclosed herein, the grains or granules of vacating material will be progressively exposed to traction with the roadway as the tread surface of the tire casing wears down, and that the progressive vacating of the grains or granules will continuously provide a cavitied or pitted surface.

It should be remarked in connection with the hardness of the grains that the latter should not be so hard as to scratch or otherwise injure the polished rollers of the mills in which the grains are incorporated with the rubber to form the tire tread or the forming mills through which the mix is passed in the manufacture of the tread therefrom. The degree of hardness characteristic of sago grains meets this requirement eminently, that is to say the conventional sago grain of commerce, while being sufficiently hard to withstand the disintegrating forces imposed upon it in the mills, is not so hard as to scratch the polished mill rollers.

It will be understood that a wide range of alternative substances to sago may be used for the purposes of the invention. Preferable alternative substances, however, are those which are possessed of the substantially homogeneous texture of sago, for example such hardened paste products as vermicelli, macaroni and materials of like nature produced from potato meal, starch or the like.

In this connection, it may be added that these particular substances and also sago are hygroscopic and possessed of the property of swelling in contact with water, with the result that the small round grains in the rubber tend to become wetted with the water of the road and the water so taken up becomes conveyed to the interface between the surface of the grain and the wall of the cavity in the rubber in which the grain is held. By this means, the surface of the grain becomes in a certain measure lubricated, which still further assists in the vacating of the grain from the cavity in the rubber. In addition, the grain swells slightly against the resilience of the surrounding rubber so as in effect to be under slight pressure from the wall of the cavity tending to project the lubricated grain out therefrom as soon as the cavity has become sufficiently opened by the wearing down of the tire coupled with the stretch of the rubber of the tread surface as the tire rolls along the road.

An example of one embodiment of the invention will now be described.

100 pounds of vulcanizable rubber composition of a type customary for the treads of pneumatic motor-car wheel tires are admixed upon a rolling mill with 7 pounds of sago grains. The mixing is continued until the incorporation of the sago grains with the rubber composition is as uniform as possible. The resulting mixture is then ready for use in the manufacture of the tire tread, which may be produced by any of the well known processes in the art.

What I claim and desire to secure by Letters Patent of the United States is:—

1. A rubber tire of the type incorporating in the tread grains of vacating material adapted in the use of the tire to fall out at the tread surface and to leave the latter in a pitted condition as herein described, wherein the vacating material consists of approximately round grains of sago.

2. A rubber tire of the type incorporating in the tread grains of vacating material adapted in the use of the tire to fall out at the tread surface and to leave the latter in a pitted condition as herein described, wherein the vacating material consists of approximately round grains of a substance selected from the following group: sago, vermicelli, macaroni.

3. A rubber tire of the type incorporating in the tread grains of vacating material adapted in the use of the tire to fall out at the tread surface and to leave the latter in a pitted condition as herein described, wherein the vacating material consists of approximately cylindrical grains of sago.

4. A rubber tire of the type incorporating in the tread grains of vacating material adapted in the use of the tire to fall out at the tread surface and to leave the latter in a pitted condition as herein described, wherein the vacating material consists of approximately cylindrical grains of a substance selected from the following group: sago, vermicelli, macaroni.

EWALD GOLTSTEIN.